United States Patent [19]

Cheng

[11] Patent Number: 5,257,553
[45] Date of Patent: Nov. 2, 1993

[54] AUXILIARY FRONT WHEEL DRIVING MECHANISM FOR BICYCLE

[75] Inventor: Kao-Pin Cheng, Changhua Hsien, Taiwan

[73] Assignee: Hsieh Chan Bicycle Co., Ltd., Changhua Hsien, Taiwan

[21] Appl. No.: 907,525

[22] Filed: Jul. 2, 1992

[51] Int. Cl.⁵ .............................. B62M 1/12
[52] U.S. Cl. .................. 74/551.8; 280/233; 280/234
[58] Field of Search ............ 74/551.8, 551.1; 280/230, 233, 234; 482/58, 59, 62, 63

[56] References Cited

U.S. PATENT DOCUMENTS

| 2,547,600 | 4/1951 | Saxer | 280/234 |
| 4,189,166 | 2/1980 | Lindsey | 280/234 |
| 4,602,781 | 7/1986 | La Marsh et al. | 74/551.1 |
| 4,726,600 | 2/1988 | Wu | 482/62 X |
| 4,773,662 | 9/1988 | Phillips | 280/234 |
| 5,078,391 | 1/1992 | Moore, Sr. | 74/551.8 |

FOREIGN PATENT DOCUMENTS

| 907577 | 3/1946 | France | 280/233 |
| 968961 | 12/1950 | France | 280/234 |
| 55343 | 1/1952 | France | 280/234 |
| 91/07308 | 5/1991 | PCT Int'l Appl. | 280/233 |
| 12172 | 5/1895 | United Kingdom | 280/234 |
| 11020 | 9/1895 | United Kingdom | 280/233 |
| 427767 | 4/1935 | United Kingdom | 280/233 |

*Primary Examiner*—Leslie A. Braun
*Assistant Examiner*—Ryan W. Massey
*Attorney, Agent, or Firm*—Bacon & Thomas

[57] ABSTRACT

An auxiliary driving mechanism associated with the front wheel of a bicycle is equipped with a pair of pneumatically actuated cylinders secured in place by a pair of spaced triangular fixing brackets and connected to the handlebar of the bicycle pivotally operated up and down by a rider's hands so as to actuate the cylinders in driving connection to the shaft of the front wheel thereof by way of sprockets and transmission devices. The pivotal handlebar of the bicycle is also coupled to the front fork by way of a head tube and a handlebar stem so that the rider can also steer the bicycle with ease and safety. Moreover, the pneumatic cylinders can also be used as pumps for inlation of the tires when necessary with the help of extension tubes.

10 Claims, 5 Drawing Sheets

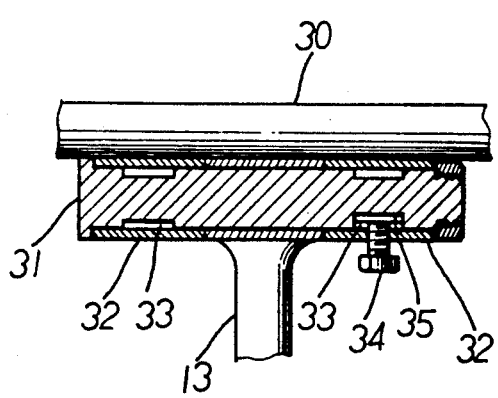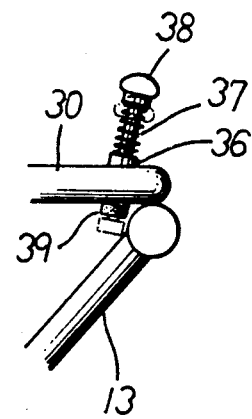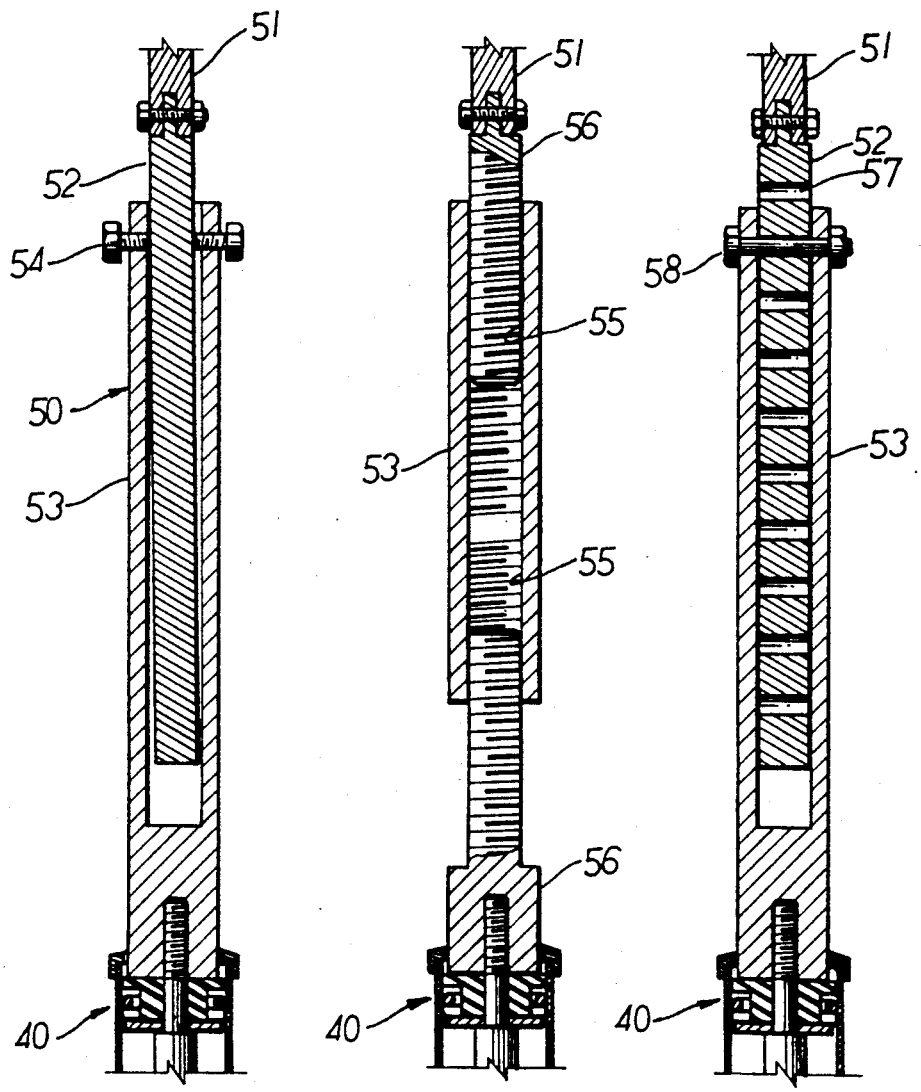

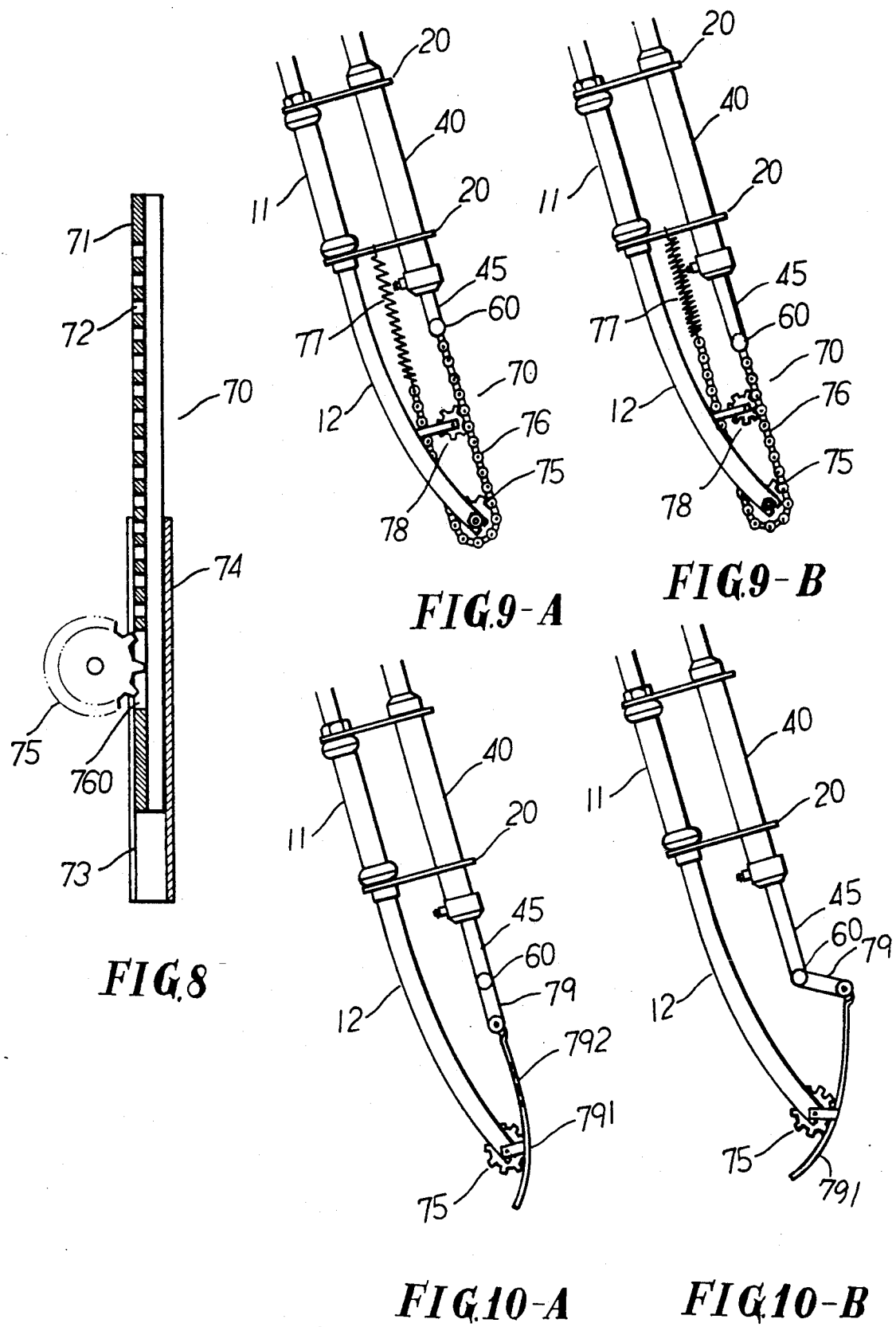
FIG.8  FIG.9-A  FIG.9-B  FIG.10-A  FIG.10-B

AUXILIARY FRONT WHEEL DRIVING MECHANISM FOR BICYCLE

BACKGROUND OF THE INVENTION

The invention relates to an auxiliary driving mechanism mounted to the front wheel of a bicycle which is actuated by the hands of a rider by way of the pivotal operation of the handlebar of the bike in addition to the conventional rear wheel driving mechanism which is actuated by the rider's feet so as to enable the rider to exercise most parts of the body. The auxiliary driving mechanism is comprised of a pair of pneumatically operated cylinders which are connected to the pivotal handlebar of the bike at one end and to the shaft of the front wheel at the other by way of gears and chains whereby the repeated actuation of the pivotal handlebar thereof along with the actuation of the pedals in driving connection to the rear wheel thereof can make the bike move with more power in one aspect and make the rider physically exercise in another aspect.

Generally, all the prior art bicycles are driven via the actuation of a pair of pedals in connection to a crank associated with a chainwheel which is coupled to a freewheel secured to the rear wheel by way of a chain.

First, this kind of bike only permits the rider to use the legs to drive the bike when the bike is employed as a transportation vehicle; and permits the rider to exercise the lower part of the body, especially, the legs, when used as an exercise instrument.

Secondly, the prior art bicycles are ridden outdoors and can not be used indoors as an exercise instrument because it can only be actuated by the pedals thereof.

Thirdly, the prior art bicycles are not equipped with a pump normally, and it is rather inconvenient to locate a pump outdoors in emergency to inflate a flat tire.

Fourthly, the prior art bicycles can only be driven by the pedals and no alternative is available, such as the front wheel driving or front plus rear wheel driving system.

SUMMARY OF THE INVENTION

Therefore, the primary object of the present invention is to provide an auxiliary driving mechanism for the front wheel of a bicycle so that a rider can actuate the front wheel thereof by repeated operation of the pivotal handlebar of the bicycle up and down so that the bike can be driven both by hands and feet which are used to actuate the pedals in connection to the rear wheel thereof.

Another object of the present invention is to provide an auxiliary driving mechanism for the front wheel of a bicycle which is equipped with a pair of pneumatically operated cylinders connected to the handlebar thereof at one end and to the shaft of the front wheel at the other end by way of gears and chains wherein the cylinders can be converted into pumps with extended ducts attached thereto so that the pumps can be available in emergency.

One further object of the present invention is to provide an auxiliary front wheel driving mechanism for a bicycle so that the same can be used as an outdoor transportation vehicle and also used as an indoor exercise instrument.

BRIEF DESCRIPTION OF THE INVENTION

FIGS. 2A, 2B are diagrams showing the handlebar in connection to a handlebar stem;

Figure 7:
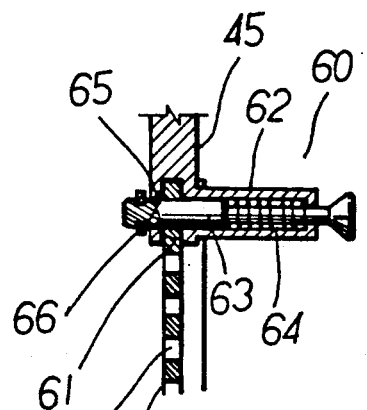
Figure 6:
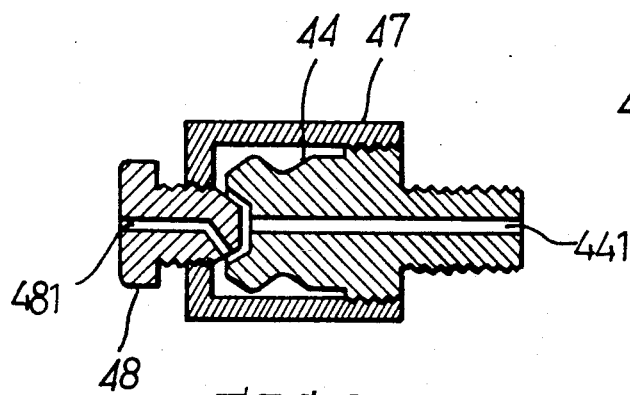
Figure 4:
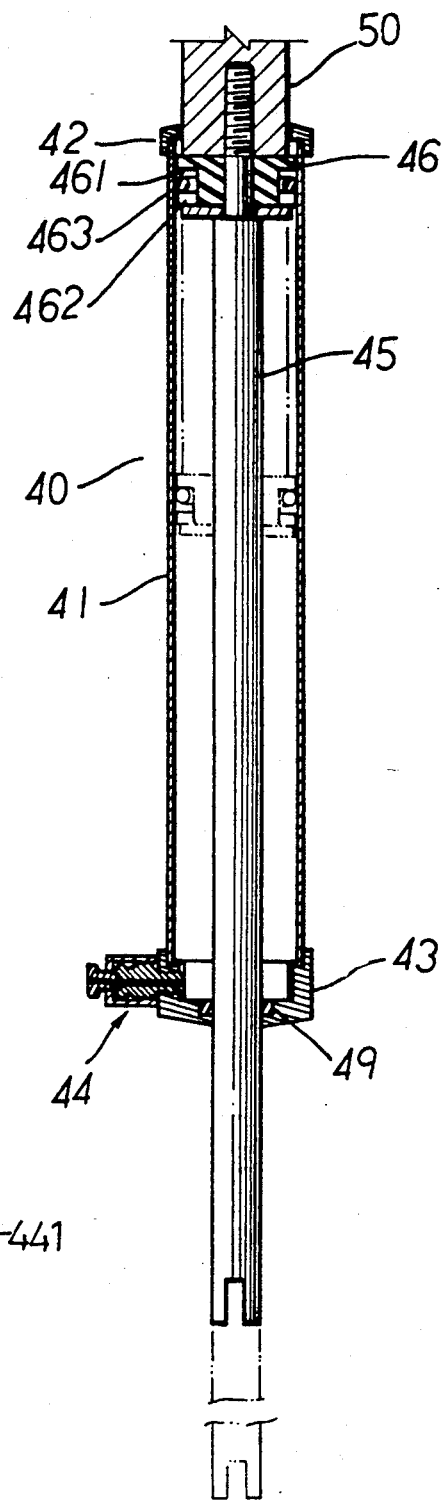
Figure 5:
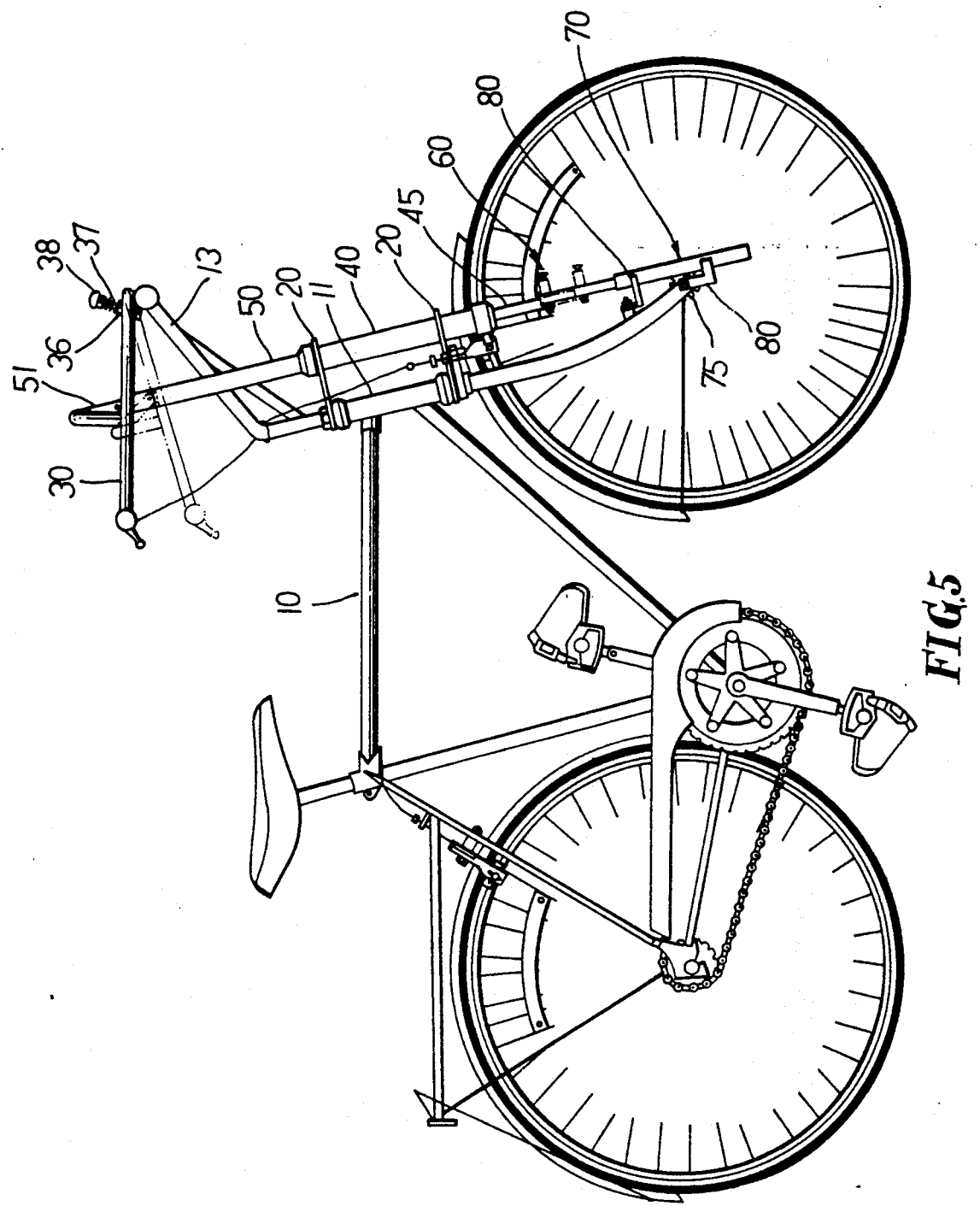

FIGS. 3A, 3B, 3C, diagrams showing three preferred embodiments of the structure of the driving rod;

FIG. 4 is a sectional view of the structure of a piston device and cylinder of the present invention;

FIG. 5 is a diagram showing the overall structure of a bicycle equipped with the front wheel driving mechanism of the present invention;

FIG. 6 is a sectional view of an enlarged quick joint of the present invention;

FIG. 7 is a diagram showing the quick disassembly device thereof;

FIG. 8 is a diagram showing the operation mode of the actuation stick of the driving device thereof;

FIGS. 9A, 9B are diagrams showing the operation mode of a second of the driving device thereof;

FIGS. 10A, 10B are diagrams showing the operation mode of a third embodiment of the driving device of the present invention.

DETAILED DESCRIPTION OF THE PREFERRED EMBODIMENTS

Figure 1:
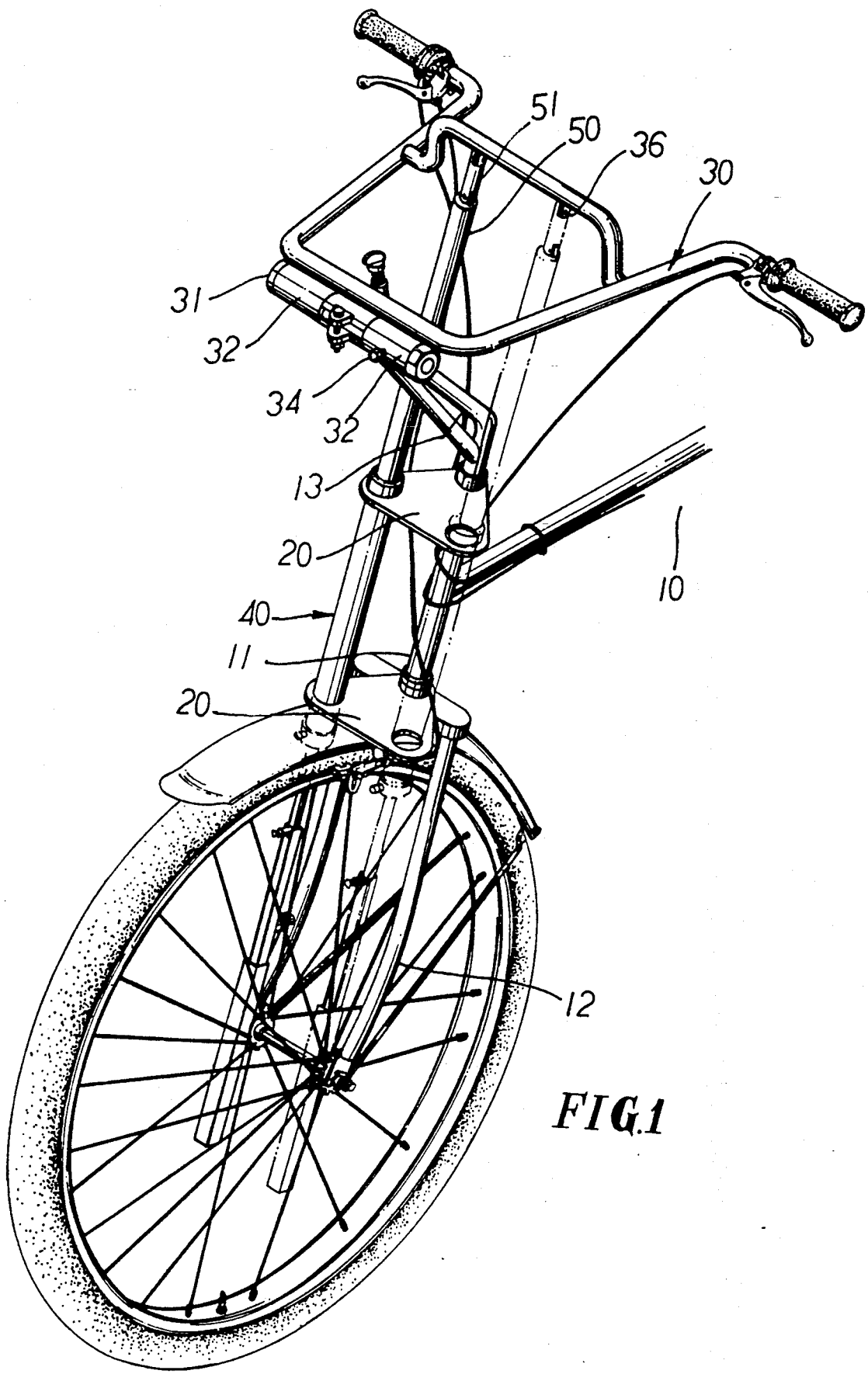
FIG. 1 is a perspective view of the present invention mounted to a common bicycle having a new pivotal handlebar.

Referring to FIG. 1, a bicycle 10 is equipped with an auxiliary front wheel driving mechanism of the present invention. The head tube 11 of the bicycle associated with a front fork 12 is attached with a pair of spaced triangular fixing brackets 20 which are able to be moved in sychronism with the front fork 12 and a handlebar stem 13 extended from the head tube 11; a handlebar 30 is pivotally associated with the top end of the handlebar stem 13; and to the two triangular fixing brackets 20 are secured one or two air pump-like units 40 to which are connected a driving rod 50 respectively. Each driving rod 50 is coupled to the handle 30 by way of a connection member 51. A quick disassembly device 60 is attached to the bottom end of the connecting rod 45 of the air pump-like units 40 so that a front wheel driving mechanism 70 can be associated therewith. Whereby the actuation of the handlebar 30 can actuate the front wheel driving mechanism 70 by way of the driving rod 50 and the air pump-like units 40. Therefore, the bicycle 10 can be both driven by feet and hands simultaneously.

The handlebar 30 and the handlebar stem 13 are connected by way of a pivot shaft 31, as shown in FIGS. 2A, 2B, which is disposed at the top end of the handlebar stem 13. A pair of sleeves 32 are secured to the handlebar 30 for receiving the pivot shaft 31 therein so that the handlebar 30 can be pivotally actuated up and down with respect the pivot shaft 31 disposed at the top end of the handlebar stem 13.

The pivot shaft 31 is provided with a pair of peripheral escape grooves 33; and the sleeve 32 is provided with a through hole for the insertion of a bolt 34. A key way 35 is disposed on one peripheral escape groove 33 so as to secure the bolt 34 in place, making the handlebar 30 fixed without pivot. A threaded sleeve 36 is secured to the handlebar 30, permitting a limiting bolt 38 associated with a spring 37 to be mounted thereto whereby the adjustment of the limiting bolt 38 will make the end of the bolt attached with a flexible component 39 come into abutment against the handlebar stem 13 in different degree. Thus, the handlebar stem 13 can vary the range of the pivotal motion of the handlebar 30 accordingly.

The handlebar 30 and the driving rods 50 are coupled to each other by way of a pair of connection members 51. The driving rod 50 can be designed in three different forms as shown in FIGS. 3A, 3B and 3C, respectively. The first type as shown in FIG. 3A comprises an inner rod 52 and a sleeve 53 which are adjustably joined together by a pair of bolts 54, as shown in FIG. 3A, the rod 52 is provided with a pair of parallel planes so that the bolts 54 can be in firm abutment against the inner rod 52 and ensure that as the driving rod 50 is actuated to move up and down, the rod 52 and the sleeve 53 can be firmly held as a whole. The second type of the driving rod 50 is made up of a pair of externally threaded rods 56 engaged with an internally threaded sleeve 55 at both ends thereof, as shown in FIG. 3B. The third type of the driving rod 50 is comprised of an inner rod 52 having a plurality of spaced through holes 57 disposed thereon so that a bolt 58 can be selectively engaged with the sleeve 53, permitting the adjustment of the length of the driving rod 50. The bottom end of the driving rod 50 is screwed to the top of the air pump-like unit 40.

As shown in FIG. 4, the air pump-like units 40 are secured to the two triangular fixing brackets 20; each unit 40 is provided with a cylinder 41 with the ends thereof attached an upper closure 42 and a lower closure 43 respectively. The upper closure 42 is provided with an opening for the insertion of the driving rod 50; and the lower closure 43 is provided with a quick joint 44 in communication with the surrounding at one side thereof. In the cylinder 41 is disposed a piston 46 connected to the end of the driving rod 50 by a connecting rod 45 which extends through an oily bushing 49 attached to the lower closure 43. On the wall of the piston 46 is disposed a peripheral groove 461 and at least a port 462 in communication with the inside of the cylinder 41 is disposed at the base of the groove 462. A sealing ring 463 having its inner diameter larger than the inner diameter of the peripheral groove 463 and the outer diameter thereof larger than the inner diameter of the cylinder 41, is located inside the peripheral groove 461 so that when the piston 46 moves up and down, the sealing ring 463 can be made to position at the bottom and top edges respectively, permitting air to flow into the interior of the cylinder 41 and further to be compressed.

Referring to FIG. 6, the quick joint 44 having a through conduit 441 is associated with a bolt 48 provided with a through conduit 481 by way of a nut 47 whereby the turning adjustment of the bolt 48 can vary the air volume delivered through the quick joint 44 and change the magnitude of a force required to actuate the piston 46, resulting in the variation of the force applied to the handlebar 30.

As shown in FIG. 7, the quick disassembly device 60 is disposed at the bottom of the connecting rod 45 which is provided with an axial opening 61 at the bottom most end thereof with a horizontal sleeve 62 disposed at one side thereof; and a stepwise rod 63 is disposed in the horizontal sleeve 62 with its front end going through the connecting rod 45 and an actuation stick 71 that are joined together thereby, and a spring 64 is disposed inside the sleeve 62 and urges against the stepwise rod 63 constantly so as to push the same toward the connecting rod 45., the stepwise rod 63 can also be pulled outward and disengage totally with the axial opening 61. At the end of the rod 63 is provided with a plurality of threads 65 and a plurality of corresponding inner threads 66 are defined on the connecting rod 45 so that the quick disassembly device 60 can be firmly secured in place to the connecting rod 45.

Referring to FIG. 8, the front wheel driving mechanism 70 is comprised of a U shaped actuation stick 71 which is provided with a through hole at the top end thereof for the insertion of the stepwise rod 63 after the actuation stick 71 is located into the opening 61 of the connecting rod 45. A plurality of equally spaced through holes 72 are disposed on the top portion of the actuation stick 71 and a particular wide opening 760 is defined on the lower portion of the actuation stick 71. The actuation stick 71 is disposed in a corresponding outer sleeve 74 having an elongated slot 73 disposed thereon which is in alignment with the side of the actuation stick 71 having the spaced through holes 72 disposed thereon so that each driving sprocket 75 mounted to one end of the shaft of the front wheel can be driven by the through holes 72 disposed on the actuation stick 71 when the same is moved up and down by the connecting rod 45. The outer sleeve 74 is secured to the bottom end of the front fork 12 by means of a pair of securing members 80. The wide opening 760 is provided in order to permit the driving sprockets 75 to spin without interference when the bicycle to be led in a reverse direction by a rider. The driving sprockets 75 of the front wheel have the same structure as the freewheel of the rear wheel which permits of only one way driving and the reverse way idle. The structure is of a prior art and will not be explained in details.

Referring to FIG. 9A, another embodiment of the front wheel driving mechanism 70 is illustrated wherein a chain 76 having one end attached to the bottom end of the connecting rod 45 of the air pump-like unit 40 is led all over the driving sprocket 75 with a guide sprocket 78 in supporting contact with the chain 76; and the other end thereof is coupled to a retaining spring 77 having the other end secured to the fixing bracket 20. The guide sprocket 78 is pivotally secured to the front fork 12 and is located above the driving sprocket 75. Thereby when the connecting rod 45 of the air pump-like unit 40 is actuated to move up and down, the chain 76 will actuate the driving sprocket 75 to spin with the help of the retaining spring 77, as shown in FIGS. 9A, 9B, resulting in the driving of the front wheel at last.

A third embodiment of the front wheel driving mechanism 70, as shown in FIG. 10A, is comprised of a curved actuation rod 791 having a plurality of through holes 792 disposed thereon which are able to engage with the teeth of the driving sprocket 75; the actuation rod 791 is connected to a pivotal elbow connection 79; and the other end of the actuation rod 791 is secured to the front fork 12 whereby the up and down movement of the connecting rod 45 can make the elbow connection 79 and the actuation rod 791 to operate accordingly so as to drive the sprocket 75 of the front wheel to spin, as shown in FIGS. 10A, 10B.

The present auxiliary front wheel driving mechanism enables a bicycle to perform the additional functions and have the following features:

1. The bicycle rider can operate the vehicle with both the hands and feet simultaneously.

2. The bicycle can be disposed on a bracket so as to convert the same into an indoor exercise equipment.

3. The air pump-like units can be converted into practical pumps with the addition of an extension tube respectively.

4. The handlebar of the bicycle can be restrained to pivot up and down or freed to pivot by way of a limiting bolt.

5. The adjustment of the quick joint of the present driving mechanism can vary the air volume in the air pump-like unit so as to change the level of the applied force to the handlebar to drive the auxiliary driving mechanism.

6. The bicycle can be driven by the front wheel or by the rear wheel respectively or by both the wheels simultaneously.

In summary, a rider can operate the bicycle of the present invention not only with the actuation of the pedal but also with the pivotal actuation of the handlebar 30 thereof without the influence of the steering of the front wheel. The downward movement of the handlebar 30 will cause the driving rods 50 in connection to the handlebar 30 by way of the connection members 51 to actuate the connecting rods 45 connected to the pistons 46 that is confined in the cylinders 41 of air pump-like units 40 whereby the actuation sticks 71 of the driving mechanism 70 which is coupled to the connecting rods 45 are able to actuate the driving sprockets 75 of the front wheel to spin, making the wheel to rotate accordingly. Therefore, the repeated up and down pivot of the handlebar will drive the bicycle forward.

I claim:

1. Auxiliary front wheel drive mechanism actuated by a rider's hands for a bicycle, comprising:
   a pair of triangular fixing brackets secured at both ends of a headtube in connection to a front fork of a bicycle in such a manner than said brackets are able to be moved in synchronism with said front fork and said headtube;
   a handlebar pivotally disposed at the top end of said headtube and connected to a driving mechanism which includes a pair of air pump-like units attached to said triangular fixing brackets; each air pump-like unit having a cylinder and a piston;
   each said air pump-like unit being coupled to said pivotal handlebar by means of a driving rod and connection member at one end and coupled to an actuation means by way of a quick disassembly device;
   said actuation means being engaged with a driving sprocket mounted on a shaft of said front wheel whereby when said handlebar is actuated by a rider said driving rod will actuate said air pump-like unit and said actuation means accordingly, resulting in the spinning of said driving sprocket, and said front wheel.

2. Auxiliary front wheel driving mechanism for a bicycle as claimed in claim 1 wherein said handlebar and said headtube are pivotally connected to each other by way of a handlebar stem having a pivot shaft disposed at one end thereof; said pivot shaft is housed in a pair of sleeve secured to said handlebar so as to permit said handlebar to be pivotally operated by way of said pivot shaft.

3. Auxiliary front wheel driving mechanism as claimed in claim 2 wherein said pivot shaft is provided with a pair of peripheral escape grooves with a groove defined in one of said escape grooves so as to permit a bolt means to engage with said pivot shaft and restrain the same in place thereby said handlebar will not be able to be pivotally operated; one of said sleeves is provided with a through hole for the passing of said bolt means.

4. Auxiliary front wheel driving mechanism as claimed in claim 1 wherein said driving rod is comprised of an inner rod having a pair of parallel planes disposed thereon; and a sleeve for receiving said inner rod is equipped with a pair of bolts which can be in abutment against said inner rod by way of said parallel planes and firmly hold the same in place, permitting the adjustment of the length of said driving rod.

5. Auxiliary front wheel driving mechanism as claimed in claim 1 wherein said driving rod is comprised of an inner rod provided with external threads and a sleeve for receiving said inner rod wherein said sleeve is provided with internal threads.

6. Auxiliary front wheel driving mechanism as claimed in claim 1 wherein said driving rod is comprised of an inner rod provided with a plurality of spaced through holes and further comprising a sleeve for receiving said inner rod and bolt means removably secured to said sleeve to engage said inner rod with said sleeve by way of one of said through holes.

7. Auxiliary front wheel driving mechanism as claimed in claim 1 wherein each said air pump-like unit secured in place by means of said triangular fixing brackets is provided with a cylinder which is attached with an upper closure and a lower closure at the ends thereof; said upper closure permits of the passage of said driving rod and said lower closure permits of the passage of said connecting rod and at the bottom side of said cylinder is disposed a quick joint having passage disposed thereon so as to permit of communication of said cylinder with the external surrounding, and a nut is engaged with said quick joint with a bolt means having a passage defined thereon attached thereto whereby adjustment of said bolt means can vary the volume of air flowing into said cylinder; a piston received in said cylinder is provided with a peripheral groove with a port disposed at the bottom thereof which communicates with the interior of said cylinder; a sealing ring housed in said peripheral groove has an inner diameter larger than the inner diameter of said peripheral groove and an outer diameter thereof larger than the outer diameter of said peripheral groove so as to render said sealing ring in close abutment against the wall of said cylinder; the adjustment of said bolt means can change the force required to actuate said piston, resulting in the variation of the operation force applied on said handlebar.

8. Auxiliary front wheel driving mechanism as claimed in claim 1 wherein said actuation means comprises U-shaped actuation stick coupled to the bottom and of said connecting rod and a number of equally spaced through holes are disposed and the upper portion of said actuation stick and a wide opening is disposed at the lower portion thereof and said actuation stick is movably housed in an outer sleeve having an elongated slot in alignment with said through holes of said actuation stick; said outer sleeve is fixed to the bottom end of said front fork by a pair of securing members; the driving sprocket mounted to the shaft of said front wheel is able to engage with said through holes of said actuation stick whereby the actuation of said handlebar can drive said actuation stick along with said driving sprocket together, resulting in the spinning of said front wheel.

9. Auxiliary front wheel driving mechanism as claimed in claim 1 wherein said actuation means comprises a chain having one end attached to said quick disassembly device of said connecting rod and another end attached to a retaining spring with said driving sprocket in operation engagement with said chain and a guide sprocket to supportively abut against said chain so that the actuation of said handlebar can drive said front wheel by way of said chain.

10. Auxiliary front wheel driving mechanism as claimed in claim 1 wherein said actuation means comprises a curved actuation rod having a plurality of through holes disposed thereon which is coupled to a pivotal elbow connection at one end which, in turn, is connected to said quick disassembly device of said connecting rod and another end thereof is operatively associated with the shaft of said front wheel; and said curved actuation rod is engaged with said driving sprocket whereby the operation of said handlebar can drive said actuation rod and said driving sprocket together so as to make the front wheel rotate accordingly.

* * * * *